No. 800,620. PATENTED OCT. 3, 1905.
R. S. BONNER.
COTTON OR SEED PLANTER.
APPLICATION FILED AUG. 8, 1905.
2 SHEETS—SHEET 2.
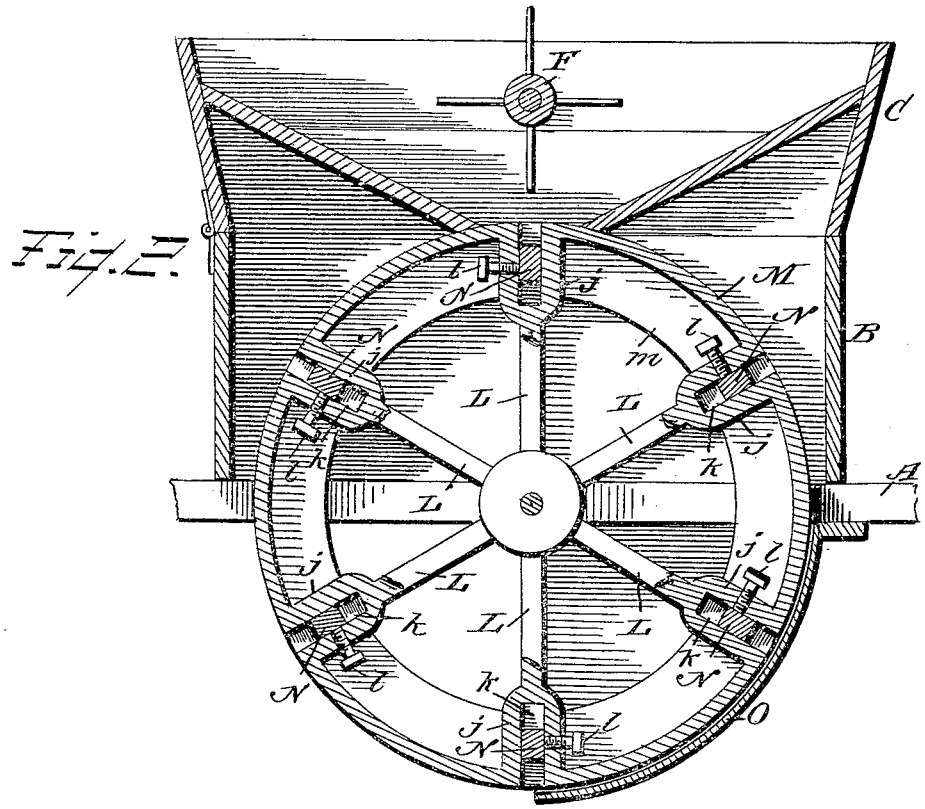
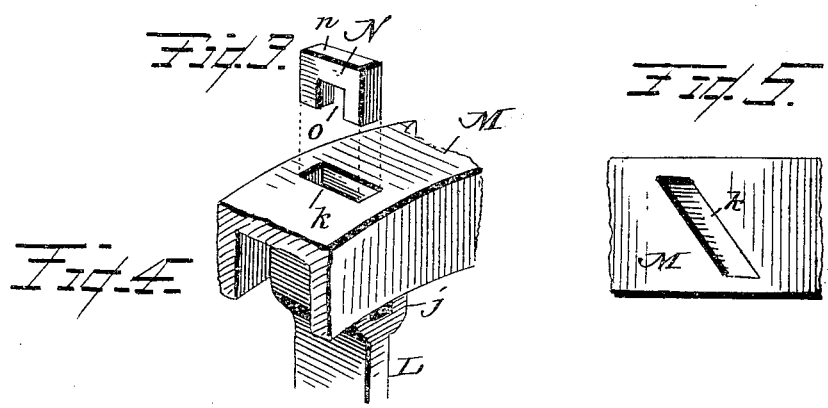
Witnesses
M. S. Mahan
Geo. C. Gould
Inventor
Richard S. Bonner,
By Chas. N. Fowler
Attorney

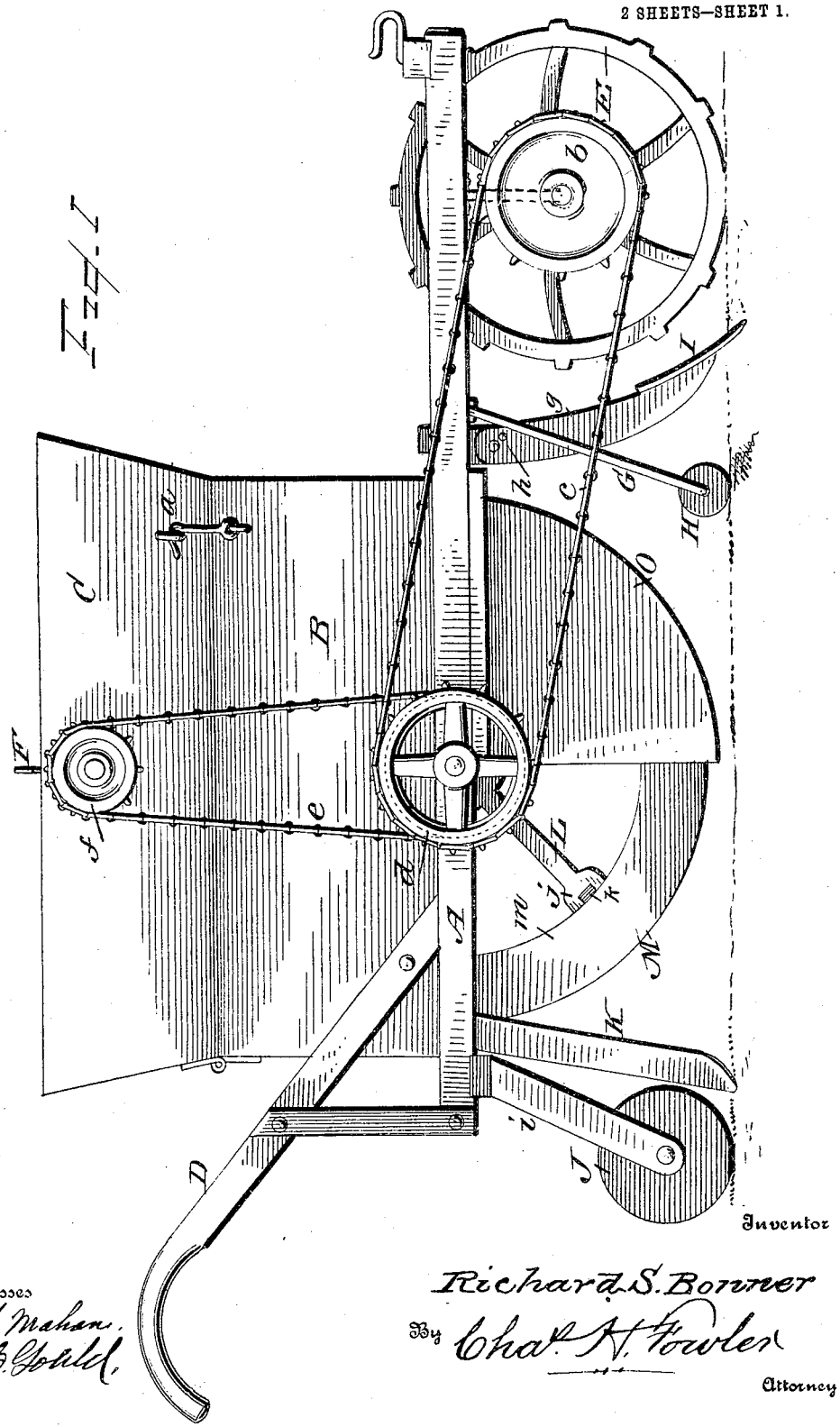

UNITED STATES PATENT OFFICE.

RICHARD SHACKLFORD BONNER, OF STATELEVEE, MISSISSIPPI.

COTTON OR SEED PLANTER.

No. 800,620.            Specification of Letters Patent.            Patented Oct. 3, 1905.

Application filed August 8, 1905. Serial No. 273,227.

*To all whom it may concern:*

Be it known that I, RICHARD SHACKLFORD BONNER, a citizen of the United States, residing at Statelevee, in the county of Tunica and State of Mississippi, have invented certain new and useful Improvements in Cotton or Seed Planters; and I do hereby declare that the following is a full, clear, and exact description of the same, reference being had to the annexed drawings, making a part of this specification, and to the letters of reference marked thereon.

The present invention has for its object to provide a cotton or seed planter that will possess many advantages over the planters in common use and in which the distributing-wheel is constructed of cast metal with radial spokes and pockets for reversible and adjustable cups and the planter improved in the many details of construction, whereby the same is rendered more effective and materially enhanced in value and more satisfactory results obtained.

The invention consists in a cotton or seed planter constructed substantially as shown in the drawings and hereinafter described and claimed.

Figure 1 of the drawings is a side elevation of a cotton or seed planter constructed in accordance with my invention; Fig. 2, a longitudinal vertical section through the hopper and distributing-wheel; Fig. 3, a perspective view of one of the reversible cups of the distributing-wheel; Fig. 4, a detail perspective view of a portion of the rim and spoke of the distributing-wheel; and Fig. 5, a plan view of a portion of the rim of the distributing-wheel, showing the diagonal pocket in place of the straight pocket shown in Fig. 4.

In the accompanying drawings, A represents the frame of the planter, which may be of any suitable construction and which supports the lower and stationary section B of the hopper, and to this stationary hopper-section is hinged the top or upper section C, which may be held in place thereon by a suitable fastener, as indicated at $a$.

The frame A is provided with the usual handles D, at the rear end thereof, and at the forward end of the frame is the driving-wheel E of any suitable construction, but preferably of the traction form and journaled to the frame in any suitable and well-known manner.

The wheel E has a sprocket-wheel $b$, with which engages a sprocket-chain $c$, said chain extending back and engaging with a sprocket-wheel $d$, journaled to the frame of the planter, and to this wheel engages a second sprocket-chain $e$, which extends up and engages a sprocket-wheel $f$, journaled to the shaft of the agitator F, located within the hopper, whereby said agitator receives its motion.

To the under side of the frame A of the planter and in the rear of the driving-wheel E is a spring-hanger G, the ends of which engage a roller H, the spring-arms of the hanger allowing the roller to yield to any obstruction and readily pass over the same.

The furrow-opener I is located upon the lower end of a pivoted standard $g$, to which it is suitably connected, the standard being held against pivotal action or held stationary by means of a wooden key $h$ or of a material that will readily break and release the standard should the opener come against any obstruction.

A covering-roller J is suitably connected to hangers $i$ at the rear of the frame of the planter, and in front of said roller are the usual knives K, adapted to run on each side of the furrow for the purpose of flushing or loosening the dirt behind the seed, so that the roller in the rear thereof will cover the seed with loose fine dirt without placing any obstruction to the seed coming up.

In describing the several details of construction hereinbefore referred to it would be within ordinary mechanical judgment to make such changes or modification of the parts as circumstances would require without in any manner departing from the essential features of the invention.

The distributing-wheel, which comprises the radial spokes L and the rim M, is cast solid of one and the same piece of metal, said spokes having bifurcated outer ends $j$, which join the rim of the wheel.

The ends of bifurcated heads $j$ form the pockets $k$ for the adjustable and reversible cups N, (shown in Figs. 3 and 4 of the drawings,) which pockets are shown as straight across the rim of the wheel; but, if desired, the pockets may extend diagonally across the rim, as shown in Fig. 5 of the drawings.

The rim M of the distributing-wheel has inwardly-extending circumferential flanges $m$, the spokes with bifurcated heads and the rim and flanges of the distributing-wheel being integral or cast from one and the same piece of metal, the circumferential flanges giving strength to the rim and reinforce the bifurcated heads of the spokes by serving as webs or braces thereto.

In describing the cups N, when the cups are disposed as shown in Fig. 3 of the drawings the cups would serve more as blocks, the part *n* thereof serving as the bottom only of the pocket, and the sides of the bifurcation serving as the walls thereto; but when the cup is reversed, so that the part *o* will form a portion of the pocket, the term "cup" would be applicable thereto, the reversing of the block or cup adapting the wheel for the distribution of various kinds of seed, as found desirable.

The frame A of the planter has connected thereto a hood O, of suitable sheet metal, so that the seed in the cups will be retained therein until the cup passes beyond the vertical edge of the hood, as shown in Fig. 2 of the drawings.

The roller H, which spreads the furrow to the desired width, enables the seed to land without bunching, and the construction of the distributing-wheel and reversible cups, as well as the straight and diagonal pockets, enables the planter to place the seed any distance wanted and may either drop the seed crosswise in the furrow or at a right or left angle, as desired.

Having now fully described my invention, what I claim as new, and desire to secure by Letters Patent, is—

1. In a cotton or seed planter, a distributer-wheel comprising a rim with inwardly-projecting circumferential flanges, radial spokes having bifurcated heads joining the rim to form pockets and adjustable and reversible cups located within the pockets and suitable means for holding the cups in their adjusted position, substantially as and for the purpose set forth.

2. A cotton or seed planter comprising a suitable frame a hinged hopper connected thereto and rotatable agitator therein, a furrow-opener connected to a pivoted standard and a roller connected to spring-hangers, a roller and knives at the rear of the planter and a rotatable distributing-wheel having radial spokes with bifurcated heads and adjustable and reversible cups located therein, substantially as and for the purpose described.

In testimony whereof I affix my signature in presence of two witnesses.

RICHARD SHACKLFORD BONNER.

Witnesses:
 NORMAN R. BURNETT,
 ELCHUL DENTON.